Patented Nov. 17, 1942

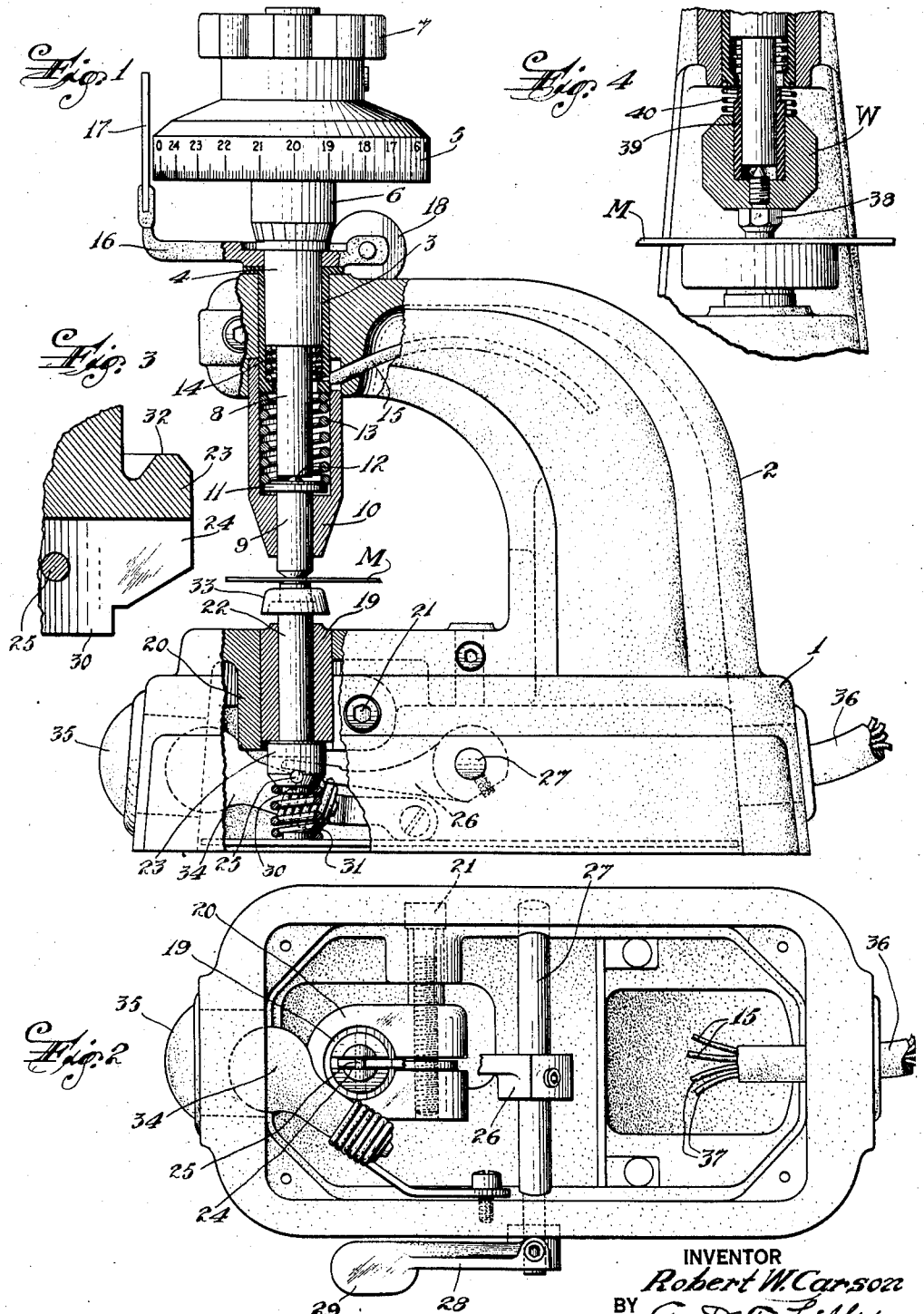

2,302,104

UNITED STATES PATENT OFFICE 2,302,104

ELECTRONIC MICROMETER

Robert W. Carson, Little Falls, N. J.

Application June 20, 1942, Serial No. 447,750

12 Claims. (Cl. 33—164)

This invention is directed to an instrument for making rapid but highly accurate thickness measurements.

In my Patent 2,290,940, issued July 28, 1942, I have shown and described practical means for making pressureless measurements. Throughout the years past, certain industries have worked out and adopted standards by which articles are to be measured. For example, the Technical Association of the Pulp and Paper Industry, known in the trade as TAPPI, have standard contact pressure and anvil or rider standards for measuring paper; to wit, an anvil diameter of 5/8" with a contact pressure of 8 lbs. per square inch which is equivalent to 2.4 lbs. on the 5/8" anvil. Their standard, using a hand micrometer, is 1/4" diameter anvil without any pressure being specified.

The ASTM have a variety of specifications differing for each material. One such specification calls for a hand micrometer with a calibrated ratchet and specifies the speed at which the micrometer jaws will close on the work. It has been experimentally determined that unit pressure for this standard is 25 lbs. per square inch, which means 20 oz. pressure on a 1/4" diameter spindle or anvil. Various other standards have been in use for a long period of time, such standards having been developed for measuring the thickness of such materials as paper, rubber, fabric, cork, felt, plastics, foil, wire, linoleum and film.

The measuring instruments heretofore available for measuring the thickness of the materials above mentioned, and others, lack the desired precision, sensitivity and freedom from errors in their operation; for example, a conventional dial gauge requires a minimum pressure of approximately 7 oz. for reliable readings to .0001". An optometer now on the market requires a contact pressure of at least 12 oz. on the anvil; another type of gauge requires 12 to 15 oz.; and a certain gauge known as the Electrolimit works best with about 20 oz. of pressure. A further measuring instrument made by a large concern requires a pressure of 2 lbs., although under certain conditions it can be operated at one pound.

With these instruments, usually, pressures less than the pressures above specified, will result in variations in point of position with repeated readings taken on the same spot of the article being measured.

It is the principal object of my present invention to provide an apparatus utilizing a pressureless measuring instrument such as set forth in my patent heretofore referred to, in combination with independent, separately controlled mechanical parts which will produce the desired holding pressure on the article being measured so as to greatly improve the standards now in force. Since the pressure exerted by the instrument to be hereinafter described is entirely independent of the measuring function, the instrument permits complete freedom in selecting the desired anvil diameter and pressure, and by reason of this greater freedom it has been found that many of the accepted standards can be changed to greater consistency, accuracy and utility.

Other and ancillary objects will be discerned from a reading of the following specification taken in connection with the annexed drawing, wherein:

Figure 1 is a view of my new instrument in side elevation, with certain of the parts shown in section.

Figure 2 is a view looking at the bottom of the instrument.

Figure 3 is a view on a much enlarged scale showing a fragmentary portion of a seat on the anvil member.

Figure 4 is a view, partly in elevation and partly in section, of a modified form of construction of the rider and anvil portion of the instrument.

The electronic micrometer includes a base portion 1 having preferably an integral rigid arm 2 extending over the base. The arm 2 carries a flanged insulator 3 which supports the sleeve 4 of a micrometer. The micrometer has a dial 5 with 250 divisions thereon and a barrel 6 marked the same as an ordinary hand micrometer, so that one division on the dial is .0001". The micrometer thread is accurate to .000025" and the instrument repeats within .00005" independent of the operator's skill.

A hand knob 7, preferably of insulating material, is used for turning the dial, the barrel 6 and the spindle 8 which makes a pressureless contact with a rider 9 adapted to be carried in a sleeve 10 which in turn is supported by the arm 2. The rider 9 has a flange 11 and a conically shaped point 12 in cooperation with the spindle 8. A spring 13 is positioned between the flange 11 and the end of the insulator 3 and applies to the rider 9 a predetermined amount of pressure.

Carried within the insulator 3 and in contact with the spindle 8 is a light spring 14 which is connected to an insulated cable 15 which extends to one terminal of an electronic circuit. Likewise, the spring 13 acts to assist in making electrical contact between the rider 9 and the sleeve 10 and the arm 2 of the instrument which is connected to the other terminal of an electronic circuit.

Positioned on the sleeve 4 is an arm 16 carrying a hair-sight 17 of transparent material. The sight 17 may be adjusted in any poistion by a control lock screw 18 for the purpose to be hereinafter described.

Carried by the base 1, is a guide bushing 19 which is held in adjustable position by a split clamp 20 and a lock screw 21. The guide bushing 19 carries a support or anvil 22 which extends upwardly to make contact with the rider 9. The lower part of the anvil 22 has a somewhat enlarged head 23 which has a vertically positioned transverse slot 24. Extending across the slot at right angles thereto and across the vertical axis of the anvil 22, is a pin 25. Resting on the pin 25 and in the transverse slot 24 is the end of a lever 26 which is fastened to a shaft 27 carried by the base 1. The shaft 27 extends at least at one end outside the casing, and on this end of the shaft is fastened a lever 28 having a hand-engaging portion 29 for turning the shaft 27 and thereby operating the lever 26. The lower extremity of the anvil 22 has a collar 30 formed thereon which is engaged by a spring 31 carried on a portion of the base 1 and which acts to hold the anvil 22 in its upward position so that an annular narrow ring portion 32 engages the lower surface of the bushing 19. At least the ring portion 32 is hardened and ground to present a long-wearing and accurate seat against the end of the ground and hardened guide bushing 19.

By reason of the construction just described with respect to the anvil 22 and its associated parts, the unbalanced weight of the retracting lever system is always applied along the axis of the anvil 22 through the contact of the lever 26 on the axially mounted pin 25. Since the end of the lever 26, working in the slot in the lower portion of the anvil 22, prevents rotation of the anvil, any deviation between the upper contact surface of the anvil and the lower contact surface of the rider 9 may be corrected by hand-lapping the top anvil surface.

The upper end of the anvil 22 may, if desired, be provided with a guard member 33 to prevent dust or dirt from working in between the anvil 22 and the guide member 19. The base 1 carries a small light bulb 34 for giving a signal through the lens 35. The cable 36 brings into the instrument the conductors 37 for conveying current to the lamp 34 and the conductors 15 from the electronic circuit.

For the electronic circuit I may use an arrangement such as shown in my patent previously mentioned, although I prefer to use the circuit shown in my Patent 2,294,831, issued September 1, 1942. However, since the electronic circuit forms no part of my present invention, it does not seem necessary to describe it herein as reference may be made to said patents.

In my patent first referred to herein, I have shown a pivoted metallic rider for making substantially pressureless contact with the material on which the measurement is to be made, but since the sensitivity of this type of rider is not required by the standards now in use for measuring the thicknesses of various materials, a rider as herein described has been substituted. If for any reason a heavier contact pressure is required on the material M, this can be suitably obtained by the arrangement shown in Figure 1 if a construction such as illustrated in Figure 4 is used.

In this construction a weight or rider W, carrying a contact 38, is positioned in concentric and tandem relationship on an insulator 39. In this particular construction the anvil is not moved and the rider W is lifted by hand to receive the material to be measured. The spring 40 adds a small amount to the pressure supplied by the weight W and also serves to electrically connect the contact 38 with the instrument frame forming one side of the electronic circuit.

Coming now to the operation of the apparatus, the hand knob 7 is turned until the end of the spindle 8 gives its pressureless measurement indication of the contact 12 on the rider 9 which is then in contact with the anvil 22. When this point is reached, the hair-sight 17 is set to zero. The micrometer spindle is then backed off an amount somewhat greater than the thickness of the material to be measured; then the lever 28 is moved to lower the anvil 22, thus allowing the material to be passed between the anvil and the rider 9; and by releasing the lever 28, the material is brought into measuring contact between the anvil 22 and the rider 9. Then the micrometer is brought into pressureless measurement with the contact 12 and a reading taken which indicates the amount the rider 9 has been lifted by the material or article being measured. Where numerous and similar parts are to be measured, this may be done rapidly through the medium of the lever systems described, as after the first measurement is taken the lever 28 is pressed and the anvil 22 retracted to release the piece and a new piece is inserted in place and then the lever 28 released so that only slight movements of the micrometer are necessary. Without the lever system as described, the measuring operations would be materially slowed down.

Since the guide bushing 19 is vertically adjustable, the anvil 22 may be set to accommodate materials of various thicknesses within a given range.

What I claim is:

1. An apparatus for making thickness measurements of materials, including a rigid metallic arm with a base support therefor, a micrometer device carried by the arm and having a spindle extending through but insulated from the arm, an electrical conductor forming one terminal of an electronic circuit with means for electrically connecting said conductor to the spindle, a metallic rider with means for supporting it in tandem relation with said spindle but insulated therefrom and having a contact surface to cooperate with the end of the spindle and means for electrically connecting said rider with the other terminal of said electronic circuit, and an anvil for the article to be measured carried by the base in alignment with and below said rider.

2. An apparatus for making thickness measurements of materials as set forth in claim 1, further defined in that lever means are provided for moving the article support downwardly away from the rider to allow the article to be quickly passed into measuring position.

3. An apparatus for making thickness measurements of materials as set forth in claim 1, further defined in that a shaft is carried by the base, the shaft having a pair of levers fastened thereto, one lever being positioned exteriorly of the base and the other interiorly of the base and having its end extending into operative relation with said anvil whereby the anvil may be moved at least downwardly by the exteriorly mounted lever for the purpose described.

4. An apparatus for making thickness measurements of materials as set forth in claim 1, further defined in that a shaft is carried by the base, the shaft having a pair of levers fastened thereto, one lever being positioned exteriorly of the base and the other interiorly of the base and having its end extending into operative relation with said anvil so as to prevent the anvil from turning, but allowing it to be withdrawn away from the rider and article being measured by the exteriorly mounted lever.

5. An apparatus for making thickness measurements of materials as set forth in claim 1, further defined in that the anvil is carried by a guide bushing adjustably mounted in the base and the lower portion of the anvil has an annular narrow ring seat for engagement with the lower end of the guide bushing, a spring for engaging the end of the anvil for normally holding the anvil seat against said bushing, and lever means actuatable outside the base for lowering the anvil.

6. An apparatus for making thickness measurements of material as set forth in claim 1, further defined in that the anvil is carried by a guide bushing adjustably mounted in the base and the lower portion of the anvil has an annular narrow ring seat for engagement with the lower end of the guide bushing, a spring for engaging the end of the anvil for normally holding the anvil seat against said bushing, and a pair of levers carried on a shaft supported by the base, one lever engaging a pin transversely carried on the axis of the anvil just below the seat, the other lever being positioned outside the base for manual operation for the purpose described.

7. An apparatus for making thickness measurements of material as set forth in claim 1, further defined in that the anvil is carried by a guide bushing adjustably mounted in the base and the lower portion of the anvil has an annular narrow ring seat for engagement with the lower end of the guide bushing, a spring for engaging the end of the anvil for normally holding the anvil seat against said bushing, and a pair of levers carried on a shaft supported by the base, the lower part of the anvil being transversely slotted in a vertical plane to receive one end of one of said levers, a pin transversely positioned across said slot and cutting the axis of the anvil to carry the end of said lever in the slot, and a second lever on said shaft positioned exteriorly of the base for manual operation for the purpose described.

8. An apparatus for making thickness measurements of materials as set forth in claim 1, further defined in that said rider is carried by a sleeve supported by said arm and concentric with the micrometer spindle.

9. An apparatus for making thickness measurements of materials as set forth in claim 1, further defined in that said rider supporting means comprises a sleeve within which the rider is slidably carried, a spring within the sleeve surrounding the lower end of the spindle but not touching it, and applying some pressure to the rider.

10. An apparatus for making thickness measurements of materials as set forth in claim 1, further defined in that said rider supporting means comprises a sleeve within which the rider is slidably carried, the rider having a flange and a contact of small area for operative engagement with the end of the spindle, a spring within the sleeve having one end resting on the rider flange, and applying some pressure thereto, the spring also acting to make electrical contact with the rider.

11. An apparatus for making thickness measurements of materials as set forth in claim 1, further defined in that the insulator which carries the spindle in the arm also carries a spring for making the electrical contact with the spindle, while the rider is spring-pressed in a sleeve carried by the arm, this spring acting to complete an electrical connection with the rider.

12. An apparatus for making thickness measurements of materials as set forth in claim 1, further defined in that said rider is carried by a sleeve and having parts thereof in both tandem and concentric relation with the micrometer spindle.

ROBERT W. CARSON.